US 8,569,989 B2

United States Patent
Wu

(10) Patent No.: US 8,569,989 B2
(45) Date of Patent: Oct. 29, 2013

(54) PULSE WIDTH MODULATION FAN CONTROLLER

(75) Inventor: Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 144 days.

(21) Appl. No.: 13/175,964

(22) Filed: Jul. 5, 2011

(65) Prior Publication Data

US 2012/0268051 A1  Oct. 25, 2012

(30) Foreign Application Priority Data

Apr. 21, 2011  (CN) .......................... 2011 1 0100887

(51) Int. Cl.
  *G05D 23/20* (2006.01)
(52) U.S. Cl.
  USPC .............. 318/599; 62/178; 62/209; 374/109
(58) Field of Classification Search
  USPC .................. 318/599, 471–473; 62/178, 209; 374/109; 236/1 C, 49.3
  See application file for complete search history.

(56) References Cited

U.S. PATENT DOCUMENTS

| | | | | |
|---|---|---|---|---|
| 6,573,671 B2* | 6/2003 | Montero et al. | ................ | 318/53 |
| 7,132,809 B1* | 11/2006 | Chang | ...................... | 318/400.13 |
| 7,761,192 B2* | 7/2010 | Lo | ................... | 700/304 |
| 7,928,680 B2* | 4/2011 | Chen et al. | .................... | 318/484 |
| 8,191,793 B2* | 6/2012 | Byquist et al. | ................ | 236/1 C |
| 2008/0306634 A1* | 12/2008 | Rozzi et al. | ................... | 700/300 |
| 2009/0228148 A1* | 9/2009 | Byquist et al. | ................ | 700/275 |
| 2011/0057589 A1* | 3/2011 | Hung | ....................... | 318/400.01 |
| 2012/0136502 A1* | 5/2012 | Liu | ............................. | 700/300 |
| 2012/0288375 A1* | 11/2012 | Wu | ................... | 417/2 |

* cited by examiner

*Primary Examiner* — Eduardo Colon Santana
*Assistant Examiner* — Said Bouziane
(74) *Attorney, Agent, or Firm* — Altis & Wispro Law Group, Inc.

(57) ABSTRACT

A pulse width modulation (PWM) fan controller is used for an electronic device. The PWM fan controller includes a number of PWM signal generators, a number of PWM signal output elements, and a control unit. The control unit includes a number of outputs. An input of each PWM signal generator is electrically connected to a corresponding output of the control unit. An input of each PWM signal output element is electrically connected to an output of a corresponding PWM signal generator. An output of each PWM signal output element is electrically connected to a corresponding fan of the electronic device. The control unit is configured to control the PWM signal generators to sequentially generate a PWM signal to drive a corresponding fan to rotate in a preset time.

8 Claims, 2 Drawing Sheets

PULSE WIDTH MODULATION FAN CONTROLLER

BACKGROUND

1. Technical Field

The present disclosure relates to a pulse-width-modulation (PWM) fan controller.

2. Description of Related Art

Rack severs have many fans installed inside a computer housing. The fans are used to dissipate heat generated by a plurality of elements such as CPUs, and hard disk drives, to reduce the temperature inside the computer housing. During the boot process of the rack sever, the temperature of the housing is low, but all the fans are working at a high speed, thereby, it is not only a waste of energy, but also may generate a loud noise.

Therefore, it is desirable to provide a PWM fan controller, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
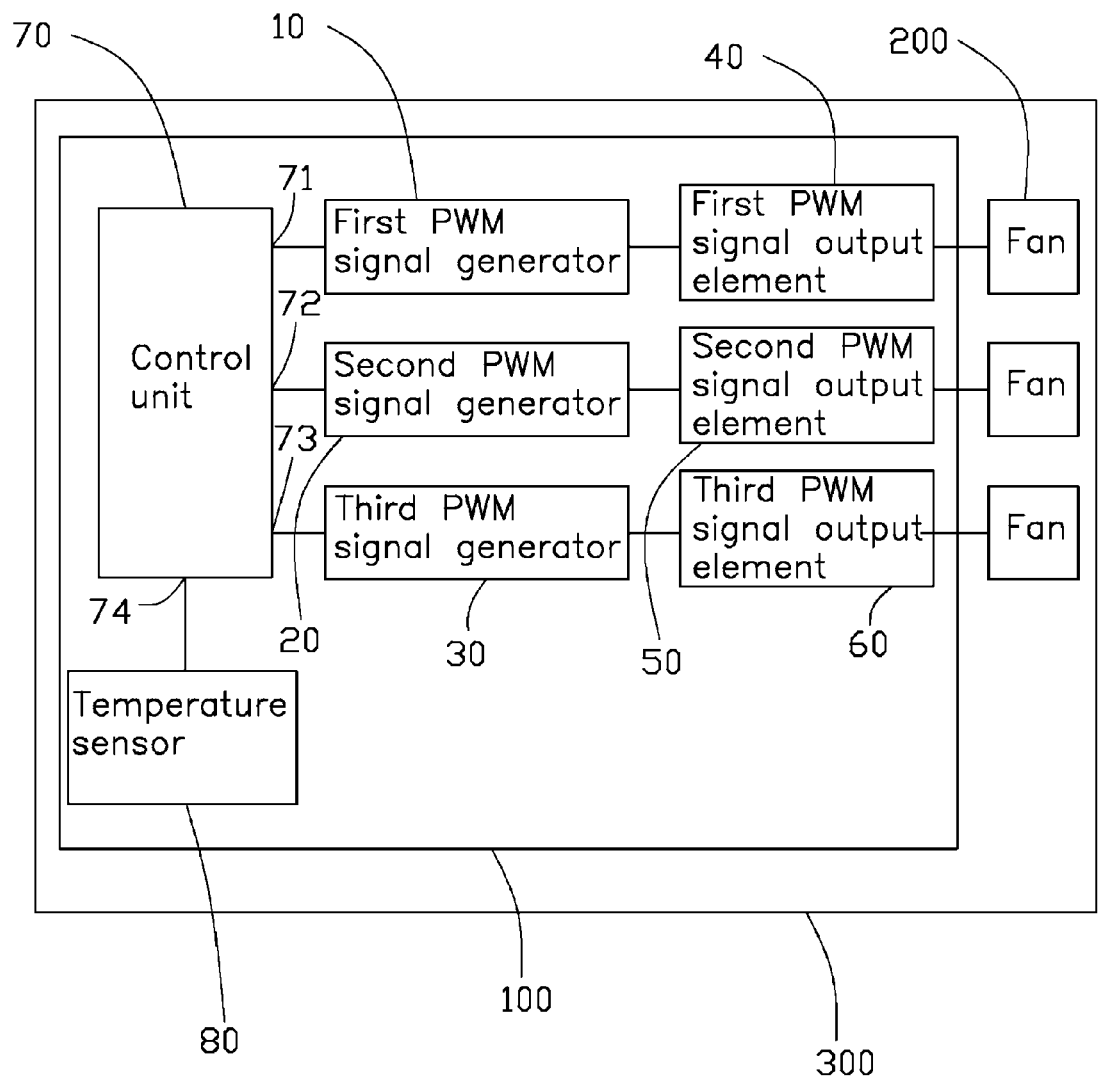
FIG. 1 is a functional block diagram of a PWM fan controller, according to an embodiment.

Referring to FIG. 1, a PWM fan controller 100, according to an embodiment, is configured for regulating rotation speeds of a number of fans 200 installed in an electronic device 300 for dissipating heat of the electronic device 300. In the present embodiment, the electronic device 300 is a rack sever, and there are three fans 200.

The PWM fan controller 100 includes a first PWM signal generator 10, a second PWM signal generator 20, a third PWM signal generator 30, a first PWM signal output element 40, a second PWM signal output element 50, a third PWM signal output element 60, a control unit 70, and a temperature sensor 80.

The first PWM signal generator 10, the second PWM signal generator 20, and the third PWM signal generator 30 respectively include an input and an output. The first PWM signal generator 10, the second PWM signal generator 20, and the third PWM signal generator 30 are configured for generating a number of PWM signals. Each PWM signal has a unique duty cycle and is associated with a predetermined unique temperature range. When the temperature of the electronic device 300 falls within a specific predetermined temperature range, each of the first, second and third PWM signal generator generates a specific PWM signal to control a corresponding fan to rotate at a specific speed. In practice, the duty cycle of each PWM signal is set such that when the temperature of the electronic device 300 falls into the corresponding predetermined temperature range, the fans 200, of which the rotation speed is regulated by the PWM signal, can efficiently dissipate heat generated by the electronic device 300 while consuming less energy and generating less noise.

The inputs of the first PWM signal output element 40, the second PWM signal output element 50, and the third PWM signal output element 60 are respectively connected to the outputs of the first PWM signal generator 10, the second PWM signal generator 20, and the third PWM signal generator 30. The outputs of the first PWM signal output element 40, the second PWM signal output element 50, and the third PWM signal output element 60 are respectively connected to the corresponding fans 200.

The control unit 70 includes a first output 71, a second output 72, a third output 73, and a first input 74. The first output 71 is electrically coupled to the input of the first PWM signal generator 10. The second output 72 is electrically coupled to the input of the second PWM signal generator 20. The third output 73 is electrically coupled to the input of the third PWM signal generator 30. The control unit 70 is configured to control the first PWM signal generator 10, the second PWM signal generator 20, and the third PWM signal generator 30 sequentially generating a PWM signal to drive a corresponding fan 200 in turn in a preset time. In the embodiment, the preset time is the boot time of the electronic device 300, which is about 15 seconds.

The temperature sensor 80 is electrically connected to the first input 74 of the control unit 70 and is configured for sensing a current temperature of the electronic device 300 and generating a corresponding temperature signal.

Figure 2:
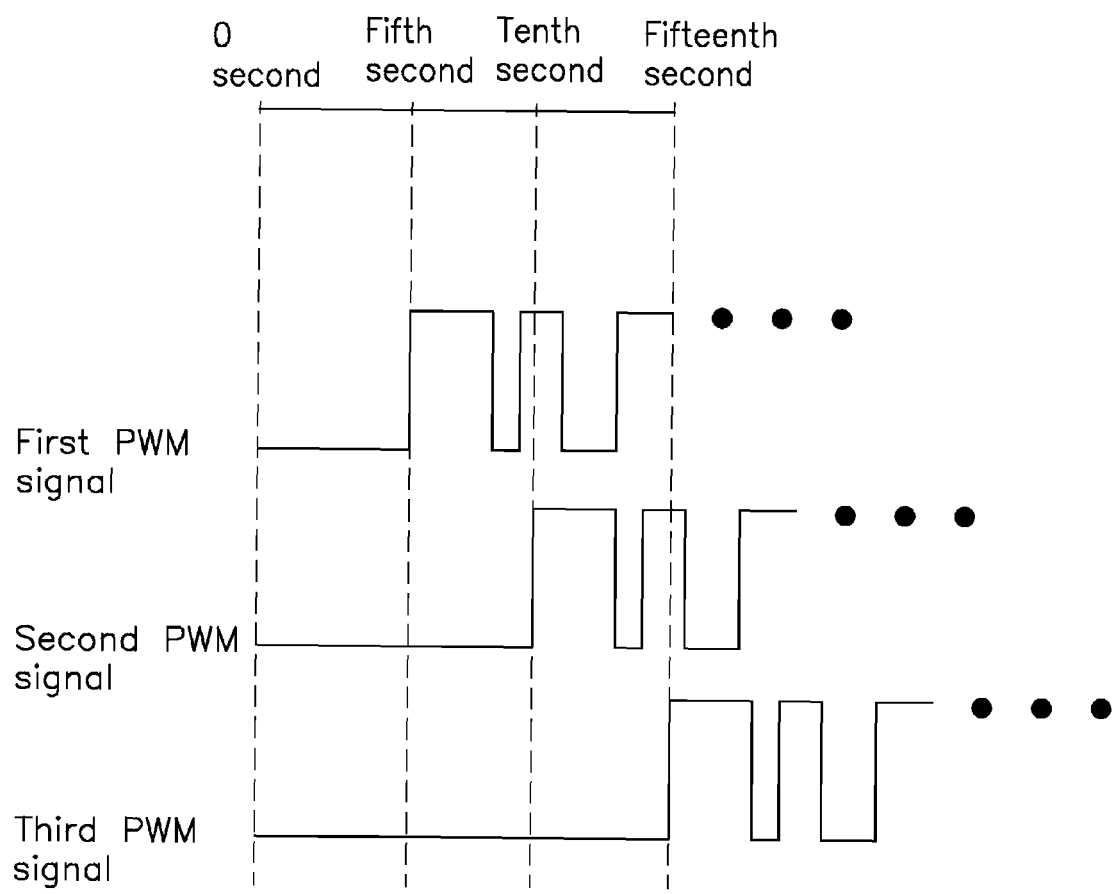
FIG. 2 is a timing chart of signals of a number of PWM signal generators of FIG. 1, according to the embodiment.

Also referring to FIG. 2, in use, during the boot process of the electronic device 300, which is about 15 seconds. In the time from the first second to the fifth second, the control unit 70 controls the first PWM signal generator 10 to begin to generate a PWM signal and transmit it to a corresponding fan 200 through the first PWM signal output element 40. Then, in the time from the sixth second to the tenth second, the control unit 70 also controls the second PWM signal generator 20 to begin to generate a PWM signal and transmit it to a corresponding fan 200 through the second PWM signal output element 50. Finally, in the time from the eleventh second to the fifteenth second, the control unit 70 also controls the third PWM signal generator 30 to begin to generate a PWM signal and transmit it to a corresponding fan 200 through the third PWM signal output element 60. As such, the three fans 200 are driven to rotate in turn, asynchronously.

After the three fans 200 all are rotating, the temperature sensor 80 begins to sense a current temperature of the electronic device 300 and generates a corresponding temperature signal to the control unit 70. The control unit 70 reads the temperature signal then controls the first PWM signal generator 10, the second PWM signal generator 20, and the third PWM signal generator 30 to output a selection control signal based upon the temperature signal, such that the selection control signal can be used to select a PWM signal corresponding to the current temperature of the electronic device 300 to control the rotation speeds of the three fans 200.

The electronic device 300 can be, for example, a computer, a gaming device, or a multimedia player. In other embodiments, the electronic device 300 can include more than three fans 200, all of which are regulated by the control unit 70.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A pulse width modulation (PWM) fan controller for an electronic device, the electronic device comprising a plurality of fans, the PWM fan controller comprising:
 a plurality of PWM signal generators configured for generating a plurality of PWM signals;
 a control unit comprising a plurality of outputs; and
 a plurality of PWM signal output elements, an input of each PWM signal generator electrically connected to a corresponding output of the control unit, an input of each PWM signal output element electrically connected to an output of a corresponding PWM signal generator, an output of each PWM signal output element configured to be electrically connected to a corresponding fan, wherein during the boot process of the electronic device, the control unit controls the PWM signal generators to sequentially generate a PWM signal to drive a corresponding one of the fans to rotate in a preset time, such that the fans are driven to rotate in turn, asynchronously.

2. The PWM fan controller of claim 1, wherein the PWM signal generators comprise a first PWM signal generator, a second PWM signal generator, a third PWM signal generator, the PWM signal output elements comprise a first PWM signal output element, a second PWM signal output element, a third PWM signal output element, the control unit comprises a first output, a second output, and a third output, an input of the first PWM signal generator is electrically coupled to the first output of the control unit, an output of the first PWM signal generator is electrically coupled to an input of the first PWM signal output element, an output of the first PWM signal output element is coupled to a corresponding fan, an input of the second PWM signal generator is electrically coupled to the second output of the control unit, an output of the second PWM signal generator is electrically coupled to an input of the second PWM signal output element, an output of the second PWM signal output element is coupled to a corresponding fan, an input of the third PWM signal generator is electrically coupled to the third output of the control unit, an output of the third PWM signal generator is electrically coupled to an input of the third PWM signal output element, an output of the third PWM signal output element is coupled to a corresponding fan.

3. The PWM fan controller of claim 2, further comprising a temperature sensor, wherein the control unit further comprises an input, the temperature sensor is electrically connected to the input and is configured for sensing a current temperature of the electronic device and generating a corresponding temperature signal.

4. The PWM fan controller of claim 3, wherein the preset time is the boot time of the electronic device.

5. The PWM fan controller of claim 4, wherein during the boot process of the electronic device, the control unit controls the first PWM signal generator to begin to generate a first PWM signal to transmit it to a corresponding fan through the first PWM signal output element, then the control unit also controls the second PWM signal generator to begin to generate a second PWM signal to transmit it to a corresponding fan through the second PWM signal output element, finally, the control unit also controls the third PWM signal generator to begin to generate a third PWM signal to transmit it to a corresponding fan through the third PWM signal output element.

6. The PWM fan controller of claim 5, wherein when the fans all are in work, the temperature sensor beings to sense a current temperature of the electronic device and generates a corresponding temperature signal to the control unit, the control unit reads the temperature signal, then controls each of the first PWM signal generator, the second PWM signal generator, and the third PWM signal generator to output a selection control signal based upon the temperature signal, the selection control signal selects a PWM signal to control the rotation speed of each fan.

7. The PWM fan controller of claim 6, wherein each of the first PWM signal generator, the second PWM signal generator, and the third PWM signal generator is configured for generating a number of PWM signals, each PWM signal has a unique duty cycle and is associated with a predetermined unique temperature range.

8. The PWM fan controller of claim 1, wherein the preset time is about 15 seconds.

* * * * *